Patented May 2, 1939

2,156,380

UNITED STATES PATENT OFFICE 2,156,380

ADHESIVE SHEETING

Richard Gurley Drew, St. Paul, Minn., assignor to Minnesota Mining & Manufacturing Company, St. Paul, Minn., a corporation of Delaware No Drawing. Application February 18, 1938, Serial No. 191,265

12 Claims. (Cl. 91—68)

This invention relates to adhesive sheets having a flexible backing and a normally tacky and pressure-sensitive water-insoluble adhesive coating united thereto, the adhesive coating being comprised of a mixture of rubber and ester gum. While not limited thereto, the invention relates especially to transparent adhesive sheets, to adhesive sheets in the form of adhesive tapes which may be sold in stacked or coiled form, and to adhesive sheets or tapes which are well adapted to the sealing or securing of wrappers composed of non-fibrous lustrous cellulosic films and the like.

The invention relates particularly to adhesive sheets having smooth non-fibrous backings of synthetic material of the type which has come into use for making flexible sheets or films, but is not limited thereto. The adhesive coating which I employ is well adapted to use on backings of the transparent non-fibrous film type, having smooth lustrous surfaces, such as cellulosic films of regenerated cellulose (normal Cellophane), cellulose esters (as cellulose nitrate, cellulose acetate and cellulose aceto-butyrate), cellulose ethers (as ethyl cellulose and benzyl cellulose), and Cellophane which has been waterproofed or moistureproofed on one or both sides by a lacquer or resin coating; all of which film materials may and generally do contain plasticizers to increase flexibility and suppleness. Other illustrative backings are films of rubber hydrochloride, chlorinated rubber, synthetic resins. Glassine paper is an example of a backing material which has been made substantially transparent and non-fibrous by the prolonged fibre-beating and the intense calendering employed in the manufacture.

In accordance with this invention, sheets of such backing material are provided with coatings of normally tacky and pressure-sensitive adhesive firmly united thereto. By "normally tacky and pressure-sensitive" it is meant that under ordinary atmospheric conditions the adhesive is stably in a condition such that it does not need to be activated by solvents or heat or otherwise prepared in order to secure good adherence to surfaces against which the adhesive coating (with its backing) may be pressed when used, to result in an aggressive adhesive bonding to the surface which resists separation therefrom except by a force greater than the pressure necessary to obtain adhesion. Furthermore, a "non-offsetting" adhesive coating is provided, meaning that the adhesive coating is possessed of such coherence in relation to adhesiveness and is so firmly united to its backing that the adhesive sheet may be stacked or rolled upon itself without offsetting upon separation or unwinding for use, and may be separated in a condition for reuse from surfaces (not possessing special chemical affinity for the adhesive), to which it may have been temporarily applied, without offsetting of adhesive material. Hence the term "non-offsetting" designates an important physical or chemicophysical property or characteristic of the adhesive coating.

An object is to provide adhesive sheets having an adhesive coating that is in elastic equilibrium with its backing so that warping and curling of the sheet, and blistering of the adhesive coating, are avoided.

Adhesive sheets are provided in which all components and the composite are transparent, so that sheets may be applied without concealing the colorings or markings of the surfaces to which applied. However, coloring material in dye or pigment form may be incorporated in the backing or in the adhesive coating. When a transparent backing is used, it may be printed in reverse, on the face which carries the adhesive and prior to coating, to provide an adhesive sheet with the printing visible through and protected by the backing.

The adhesive sheets may be prepared with a surface continuously coated with adhesive, as in the case of ordinary adhesive tapes, labels and seals, or with the adhesive on certain areas only, as in the case of a packaging sheet provided with coated portions to permit sealing without the use of other sealing means.

While the adhesive coating may be applied directly to the backing sheet, it is preferable, especially when the side of the backing which carries the adhesive is of a smooth lustrous nature and insoluble in the solvent used in applying the adhesive coating, to provide an interposed primer coating in order to secure greater unification and fully guard against subsequent offsetting in use.

As previously stated, this invention relates to adhesive sheets in which the adhesive coating is comprised of a mixture of rubber and ester gum. In the description and claims it will be understood that I refer to the low-acid type of ester gum (acid number generally 2–10). I have discovered that this type of resin has unsuspected advantages in comparison with related types. When similar rubber-resin adhesive coatings are employed using rosin as the resin, and applied on cellulosic film backings or the like (with or without an interposed primer coating), the following disadvantageous features develop: If wood rosin is used, there will be a gradual development of small crystals throughout the coating, while if gum rosin is used there will be an absence of crystallization but a more rapid aging, and furthermore gum rosin imparts inferior color and transparency. The use of ester gum makes for better aging and there is an entire absence of crystallization, while the color and transparency of the adhesive coating are as good as when the best grade of wood rosin is employed. The use of ester gum makes for greater cohesiveness (firmness), a characteristic which is especially desirable when the backing is of regenerated cellulose. In rolls of adhesive tape having this type of backing considerable pressure is exerted on the adhesive coating due to the forces set up by the backing absorbing moisture from the atmosphere and swelling, which results in oozing of adhesive from the sides of the roll unless the adhesive is quite firm and has good aging properties.

The following examples illustrate adhesive compositions suitable for use in accordance with my invention, all parts being by weight.

Example 1

| | Parts |
|---|---|
| Milled latex crepe | 250 |
| Ester gum | 175 |
| "Flectol B" (antioxidant) | 1.25 |
| Heptane (volatile solvent) | 2500 |

The raw latex crepe is milled for about 10 minutes, at a temperature of about 140–150° F., and is then cut into small pieces.

The ester gum is dissolved in an equal amount of the solvent, and the "Flectol B" is likewise dissolved in a portion of the solvent. The balance of the solvent (to make a total of 2500 parts) is placed in a suitable churn and the solutions of ester gum and "Flectol B", and the milled latex crepe, are added. The mixture is mixed until homogeneous, involving mixing for about 40 hours at a temperature of about 70–100° F. The resulting adhesive solution is ready for use to form, upon spreading and evaporation of the solvent, a normally tacky and pressure-sensitive non-offsetting transparent adhesive coating.

The indicated heptane may be substituted for by another volatile rubber solvent such as benzol or naphtha. It will be understood that the proportion of solvent may be varied to produce the desired viscosity of the adhesive composition.

For forming highly aggressive adhesive coatings, the ester gum should be used in the ratio of about 0.5–0.9 part per part of rubber. The ratio in the above formula is 0.7. To form coatings which are less tacky, but still "pressure-sensitive", the ratio may be reduced to as low as 0.2. The degree of adhesiveness is also influenced by the extent to which the rubber has been milled—the greater the milling the less ester gum needed for a given adhesiveness. However, extended milling will cause the adhesive to have less body (firmness).

Example 2

| | Parts |
|---|---|
| Milled latex crepe | 250 |
| Ester gum | 175 |
| "Flectol B" | 1.25 |
| Heptane | 1550 |
| Alcohol | 15.5–31 |

The procedure is the same as in the preceding example.

The alcohol may be denatured ethyl alcohol (for example containing 5 volumes of methyl alcohol or ethyl acetate per 100 volumes of 190 proof ethyl alcohol) or may be methyl alcohol. The function of the alcohol is to reduce the quantity of rubber solvent required to produce a solution of desired viscosity. Thus in Example 2 the ratio of heptane to rubber is 6 to 1, in comparison with the 10 to 1 ratio of Example 1, although only a relatively small amount of alcohol is used.

In the above examples, "Flectol B" (a liquid condensation product of acetone and aniline) is used as an antioxidant to improve the rubber aging qualities. Other suitable antioxidants or age-resisters are: "Flectol H" (a solid condensation product of acetone and aniline), "Solux" (p-hydroxy-N-phenylmorpholine), "Agerite Resin" (aldol-alpha-naphthylamine reaction product), "Antox", beta-naphthol, "Agerite Alba" and "Agerite White". Those which are soluble in the rubber solvent may be added directly, otherwise they may be milled into the rubber during the initial milling.

As previously mentioned, a coloring pigment may be incorporated in the adhesive. This may be conveniently accomplished by milling the pigment into the rubber during the preliminary milling of the latter. Thus para toluidine red may be added to give a red color, or gold bronzing powder to give a gold color. Zinc oxide may be incorporated if desired.

A suitable primer may be made using the following formula:

Primer

| | Parts |
|---|---|
| Reclaim rubber | 90 |
| Latex crepe rubber | 10 |
| Whiting (optional) | 40 |
| Wood rosin (preferably FF or "Solros") | 140 |

The reclaim rubber and latex (and whiting or other reinforcing pigment when used) are compounded together on the ordinary type of rubber mill and milled for 30–40 minutes. This milled base is then transferred to a heavy duty internal mixer (such as a Baker Perkins Mogul type mixer) and milled for 1–2 hours with 10–20 lbs. steam pressure in the heating jacket. The rosin is then added and mixing is continued for another hour. The jacket steam is then turned off and the mass cooled. The requisite amount of solvent (heptane or benzol for example) is then added, preferably in amount equal to 4–5 parts by weight per part of reclaim rubber. Mixing is continued, generally for about ½ hour, until the whole mass is homogeneous. The resulting primer composition or solution is then ready for application to the backing.

In this method of compounding, the reclaim rubber becomes plasticized by the mechanical working in the presence of heat and air, and is further plasticized by the rosin which is thoroughly incorporated with the rubber.

The reclaim rubber is superior to raw rubber, for use in the primer, for several reasons, including: The primer coating is rendered difficultly soluble in the rubber solvent contained in the subsequently applied adhesive solution, because the reclaim rubber is in a partially vulcanized state which greatly decreases the rate of solution in rubber solvents. The primer coating has a greater bonding action, i. e., becomes more firmly unified to the backing and to the adhesive coating, due to the higher adhesion value of the reclaim rubber resulting from the heating cycle and amount of break down experienced in the reclaiming process. These features are obtained without sacrifice of firmness or coherency of the primer coating, due to the high cohesiveness of the reclaim rubber resulting from its prior vulcanization. If raw rubber were subjected to the same treatment, it would have softness and stickiness but would lack adequate cohesiveness.

Partially vulcanized raw rubber may be used in place of the reclaim rubber, but the latter is preferred.

The reclaim rubber above referred to in the formula for making the primer is preferably made as follows:

Light colored inner tube stock may be utilized, though other forms of vulcanized rubber may be used. Where inner tube stock is used, it is chopped up on mill rolls, preferably of the type utilizing breaker members, simulating heavy gear teeth. Rolls of this character operate in pairs, the top one being free to move up and down, while the lower one is stationary. Relative rotation of these rolls serves to chop up the scrap. After the scrap is chopped and torn apart, it is fed to the breakers, which pulverize it further, whereupon it is then passed over a screen and the fine particles separated out. The coarse particles are recirculated through the breakers until they also go through the screen. The fine particles are then charged into horizontal digesters, where they are treated with caustic soda solution, the heating of the stock being carried out under a steam pressure of about 40 pounds while being agitated. This treatment is carried out from 8 to 24 hours, to remove all fibres and free sulfur, and to plasticize the rubber. After digestion as above described, the stock is washed with water until practically free from caustic. The stock is then charged into a continuous belt drying system, where it is dried at a rather low temperature. The stock is then ready for the mill room, where the first operation is to mass these small particles together on a large mill. After consolidation on the large mill, the rubber is then run through refiners, which comprise grinding and crushing any of the hard particles of the stock. The product is then passed through a strainer in which the rubber is extruded through heavy mill screens into small rod-like forms, after which they are massed together into sheets or slabs.

In some cases the procedure above described may be slightly varied, for example, when certain types of inner tube reclaim are desired, the pulverized scrap is heated in the presence of steam alone, without any caustic. It is thereupon, after being heated, sent directly to the mill room, without any further treatment.

As an example of one method which may be followed in preparing the composite, the following procedure is recommended. A web of regenerated cellulose film (or other backing material) of the desired thickness is carried through a set of vertically positioned squeeze rolls. The lower roll has transferred to it, or dips into, the solution of the primer composition. A uniform thin layer of primer is applied at this point to the film or web of backing material. The web thus prepared travels from the squeeze rolls to a duct for removing and drying off the solvents in the primer. The web then is directed to a contrivance for coating, at which point a doctor knife or coating knife is used to spread a film of the composition of adhesive material. The composition is directly applied over the primer and the composite as coated is either hung in festoons or travels through a drying duct, at which point sufficient time is allowed for complete removal of the solvent, and to form the deposition product to the desired consistency, due to the solid components present, for tackiness. If heat has been utilized to separate the solvent from the deposition product resulting in the adhesive, the composite thus formed may be cooled and brought to room temperature, to render the product in more convenient form for stacking or winding into rolls. Where wound into rolls, the composite thus formed is then cut or converted into small rolls, suitable for trade requirements.

The adhesive composition as deposited upon the film as heretofore described is one which is normally tacky and pressure-sensitive. It is of particular utility in connection with the lustrous, highly polished backing material described, in that the adhesive layer is in equilibrium with it and will not alter or warp its appearance. As indicated, the adhesive layer is unified in that it has great adhesion inter se (coherence) and when applied forms a unified product with the backing material. When wound into rolls or formed into stacks, the lustrous surface of the backing will not be modified, no offsetting will occur and ready separation is assured of the entire composite from its adjacent layer.

The whiting employed in the primer serves as a reinforcing pigment, imparting greater cohesiveness and firmness. It does not prevent transparency, for the primer coating is quite thin.

Mention has been made of using a film of a cellulose ester or ether as the backing. Such backings have an advantage over regenerated cellulose films in that the latter are hygroscopic, whereas the cellulose derivatives such as cellulose acetate, cellulose nitrate, cellulose aceto-butyrate, ethyl cellulose and benzyl cellulose, are waterproof and non-hygroscopic.

What I claim is as follows:

1. An adhesive sheet having a substantially transparent flexible sheet backing and an adhesive coating firmly united thereto and comprised of raw rubber and low-acid type ester gum combined in proportions such that the coating is highly coherent and normally tacky and pressure-sensitive.

2. An adhesive sheet having a substantially transparent flexible sheet backing and an adhesive coating firmly united thereto and comprised of latex crepe and low-acid type ester gum combined in proportions such that the coating is highly coherent and normally tacky and pressure-sensitive.

3. A substantially transparent adhesive sheet having a substantially transparent flexible sheet backing and a substantially transparent adhesive coating firmly united thereto and comprised of raw rubber and low-acid type ester gum combined in proportions such that the coating is highly coherent and normally tacky and pressure-sensitive.

4. A transparent adhesive sheet having a transparent non-fibrous film backing and a transparent adhesive coating firmly united thereto and comprised of latex crepe and low-acid type ester gum combined in proportions such that the coating is non-offsetting and normally tacky and pressure-sensitive, the back surface of the backing being inactive to said adhesive to permit removal or unwinding from stacks and rolls without perceptible offsetting of adhesive.

5. An adhesive sheet having a transparent cellulosic film backing and an adhesive coating firmly united thereto and comprised of raw rubber and low-acid type ester gum combined in proportions such that the coating is nonoffsetting and normally tacky and pressure-sensitive.

6. A transparent adhesive sheet having a transparent cellulosic film backing and a transparent normally tacky and pressure-sensitive adhesive coating firmly united thereto and comprised of essentially one part lightly milled latex crepe and about 0.5–0.9 part low-acid type ester gum.

7. An adhesive sheet having a transparent regenerated cellulose film backing and an adhesive coating firmly united thereto and comprised of raw rubber and low-acid type ester gum combined in proportions such that the coating is non-offsetting and normally tacky and pressure-sensitive.

8. A transparent adhesive sheet having a transparent regenerated cellulose film backing and a transparent adhesive coating firmly united thereto and comprised essentially of one part lightly milled latex crepe and about 0.5–0.9 part low-acid type ester gum.

9. An adhesive sheet having a transparent film backing, a non-offsetting normally tacky and pressure-sensitive adhesive coating firmly united thereto and comprised of raw rubber and low-acid type ester gum, and an interposed primer coating comprised of plasticized partially vulcanized rubber and a greater proportion of compatible resin.

10. An adhesive sheet having a transparent cellulosic film backing, a non-offsetting normally tacky and pressure-sensitive adhesive coating firmly united thereto and comprised of raw rubber and low-acid type ester gum, and an interposed primer coating comprised of a minor proportion of reclaim rubber plasticized by mechanical working in the presence of heat and air and a major proportion of compatible resin.

11. A transparent adhesive sheet having a transparent cellulosic film backing, a non-offsetting normally tacky and pressure-sensitive transparent adhesive coating firmly united thereto and comprised of latex crepe and low-acid type ester gum, and an interposed transparent primer coating comprised of a minor proportion of reclaim rubber plasticized by mechanical working in the presence of heat and air and a major proportion of wood rosin.

12. A transparent adhesive sheet having a transparent regenerated cellulose film backing, a normally tacky and pressure-sensitive transparent adhesive coating united thereto and comprised of one part lightly milled latex crepe and about 0.5–0.9 part low-acid type ester gum, and an interposed transparent primer coating comprised of about 90 parts plasticized reclaim rubber, 10 parts latex crepe, 40 parts whiting and 140 parts wood rosin.

RICHARD GURLEY DREW.